Oct. 24, 1933.  B. O. GODFREY  1,932,103
DIRECT READING PITCHOMETER
Filed Oct. 21, 1931  2 Sheets-Sheet 1
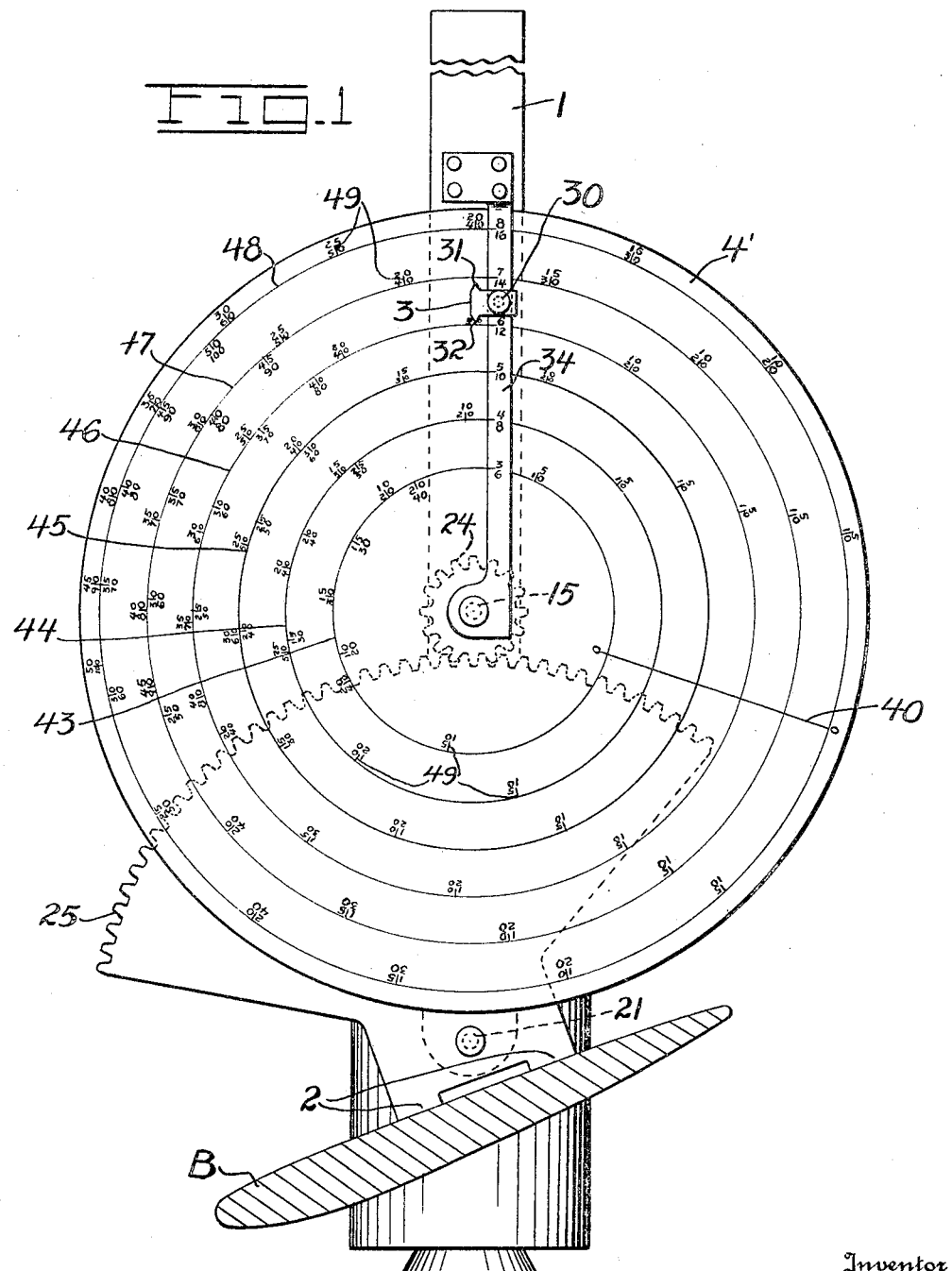
Inventor
Bert O. Godfrey
By Charles L. Reynolds
Attorney Oct. 24, 1933.   B. O. GODFREY   1,932,103
DIRECT READING PITCHOMETER
Filed Oct. 21, 1931   2 Sheets-Sheet 2
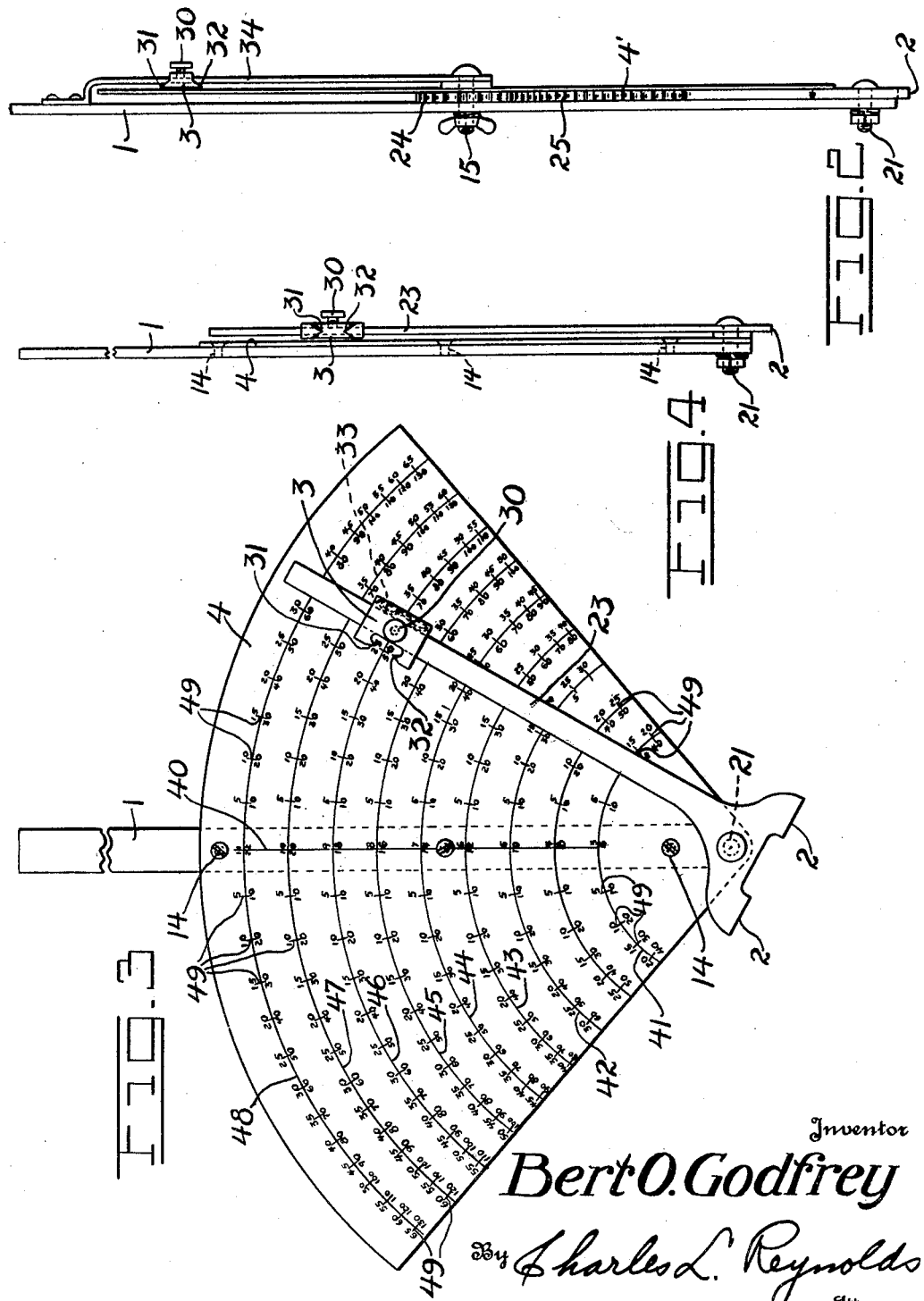
Inventor
Bert O. Godfrey
By Charles L. Reynolds
Attorney Patented Oct. 24, 1933

1,932,103

UNITED STATES PATENT OFFICE 1,932,103

DIRECT-READING PITCHOMETER

Bert O. Godfrey, Brooklyn, N. Y.

Application October 21, 1931. Serial No. 570,134

8 Claims. (Cl. 33—174)

My invention relates to pitchometers of the general type illustrated in my Patent 1,547,380. The tool, which is the subject matter of this application, may be employed in conjunction with devices for exactly positioning it relative to the axis of the propeller being measured, relative to a radius therefrom, and relative to circles at given radial distances, as in that patent, or it may take the form of a simple hand tool to be aligned with the propeller axis by visually aligning an alignment bar, associated with the tool, with a bar disposed in the propeller axis.

In the employment of pitchometers heretofore it has been customary to ascertain the pitch angle at any selected radial distance of measurement, and thus, knowing the radius and the angle, to determine from a chart the pitch distance; or, in checking a propeller for trueness, to determine from a chart the proper pitch angle for a given radial distance and a known or any given pitch distance, and then to observe whether the actual pitch angle of the propeller blade checks with that shown by the chart to be necessary. Such operations, involving reference to a chart, cannot avoid the possibility of error, and the operation cannot be carried out as rapidly as if such reference were unnecessary. Charts of the size necessary cannot conveniently be posted in shops where such trueing-up operations are carried out.

Accordingly it is an object of my present invention to devise a tool having incorporated in it specially calibrated scale means and cooperating index means, by the use of which the proper pitch distance at any given radius for an observed or any given pitch angle is indicated directly, thus making reference to a chart unnecessary, and eliminating the possibility of error.

Since graduations and numerals on such a scale plate would for some radial distances lie quite close together, were the tool to be made up in the form illustrated in my patent referred to, it is an object of my invention to devise such a tool whereby the movement of the scale plate relative to the index pointer is magnified, whereby the spacing between such index marks may be made wider and whereby finer subdivisions may be employed.

It is also an object to devise a pitchometer having the advantages enumerated, which can be incorporated into a small hand tool, if desired, or which is equally applicable to the complete machine as shown in the patent referred to.

It is a further object to devise such a tool capable of use throughout a considerable range of radial distances and having an index pointer adjustable to co-operate with a plurality of scale markings.

Other objects will be ascertainable from a study of the accompanying drawings, of this specification, and of the claims.

My invention comprises the novel parts and the novel combination thereof, as shown in the accompanying drawings, described in this specification, and as will be more particularly pointed out by the claims which terminate the same.

In the accompanying drawings I have shown my invention embodied in forms which at present are preferred by me, those forms being such as will enable measurement of both right and left hand blades.

Figure 1 is a side elevation of the preferred form of pitchometer, shown applied to a propeller blade.

Figure 2 is an edge view of this pitchometer.

Figure 3 is a side elevation of a simpler form of the pitchometer, and Figure 4 is an edge view of this form.

Since it is necessary that the pitchometer generally and the zero point thereof particularly (typified by the line 40), be aligned with the axis of the propeller being measured, I may accomplish this by the provision of an alignment bar 1. Either this bar extends for a sufficient distance to enable it to be visually aligned with a bar disposed in the axis of the propeller, as is common in the art, or this bar may form the support for the tool in such a device as is illustrated in my Patent No. 1,547,380. Cooperating with this alignment bar are trammel points 2, of which preferably there are two, these trammel points being pivoted at 21 to the alignment bar 1, whereby they may move angularly with respect to the alignment bar. It is the function of these trammel points to contact with the blade of the propeller at known radial distances, and preferably disposed equidistant at opposite sides of a radius, thus to provide means whereby the angle assumed by a line joining the trammel points with respect to a horizontal line may be determined. Such a line approximates the segment of the circle whereon the measurement is made, the angle of which relative to a plane normal to the propeller axis is the actual pitch angle, at that particular radius. The trammel points and the alignment bar, then, constitute a relatively angularly movable pair of members.

Associated with one member of such a pair is a scale-bearing plate or disk, and in the simpler form shown in Figure 3 this takes the form of a sector-shaped scale plate 4, secured to the alignment bar 1 by the bolts or screws 14. Associated and movable with the other member of the relatively movable pair is an index member. The scale-bearing plate or disk and the index member form a second relatively movable pair of members. The index member consists of an index arm 23 secured to or formed as part of the trammel points and movable therewith, and a slide 3 movable lengthwise of this arm, the slide being held in any selected position lengthwise of the arm 23 by a clamping screw 30, and the slide carrying index pointers 31 and 32, respectively. A spring 33 may be employed to hold the slide frictionally in position while adjustments are being made.

Upon the scale plate 4, in addition to the zero line 40, are a series of lines 41, 42, 43, 44, 45, 46, 47 and 48, drawn concentrically about the center 21, these corresponding to different radii of measurement upon the propeller blade B. Each of these lines is subdivided by the scale marks 49, which are not equally spaced, but which represent the intersection with such circles of the hypotenuse of a triangle which corresponds to the pitch angle at the selected radial distance of the particular circle, and alongside these marks are placed numerals which designate the pitch distance for such pitch angles at the given radial distances of measurement. Certain of these numerals are placed above the lines and others below, the one series being twice the other series, and the numerals along the line 40, indicating the radial distances, are likewise one set twice the value of the other set, for it is recognized that the pitch angle corresponding to a pitch distance of, for instance, twenty-five units (whatever units are employed) at a radius of nine units, is the same pitch angle as that which corresponds to a pitch distance of fifty units at a radius of eighteen units. The pitchometer is set to indicate such a situation in Figure 3. The index pointers 31 and 32 may, if desired, be so set as to obscure one set of figures and to point to the others.

In the form of the tool shown in Figures 3 and 4 the index arm 23, carrying its slide 3, may only sweep for a limited distance, within practical limits, across the scale plate 4, and some of the scale markings 49 are found to be rather close together, hence it is not possible to employ any considerable number of intermediate markings. It is desirable, therefore, that the relative movement of the scale plate and index member be increased, for a given angular change in the position of the trammel points, and one way of accomplishing this result is shown in Figures 1 and 2. In this form the scale plate 4' takes the form of a disk. The trammel points 2 are pivoted at 21 upon the alignment bar 1 as before, but the disk 4' is not fixed to the alignment bar, being instead rotatably mounted thereon by means of the pin 15. This pin 15, then, constitutes the center of the lines 43, 44, 45, 46, 47, 48, which now assume the form of complete circles. The scale marks 49 in this form are widely spaced, and while only certain marks have been shown in the drawings, it is evident that a considerable number of intermediate marks may be employed, with a corresponding increase in accuracy and exactness.

The slide 3 of the index member in this case is secured to move with the alignment bar 1, rather than with the trammel points 2, since the scale plate is now movable in accordance with the other member of the movable pair—the trammel points. The slide is mounted upon the index bar 34, which constitutes a part of the index member. The bar 34 bears the indications of radial distance. This index arm 34 may be extended to provide one bearing for the center pin 15.

In order to cause movement of the scale disk 4' relative to the alignment bar 1 and index element 3 upon movement of the trammel points, any suitable connection between them for multiplying the movement of the disk for a given movement of the trammel points may be employed. As shown, a gear segment 25 is formed integral with the trammel points, and a small gear or pinion 24 is secured to the disk 4', so that upon rotation of the gear 24, the disk 4' will rotate correspondingly, and it will be evident that the disk may rotate through several revolutions while the trammel points are moving through a limited angle, depending upon the gear ratio between the gears 24 and 25. Since this is the case the spacing between the indicating numerals for each of the scale marks 49 may be multiplied several times, and this added spacing must be taken into consideration in marking out the scale marks 49, the distance being measured from the zero line 40, not only once about each circle, but several times thereabout, if desired or found necessary.

By either arrangement described there are formed two relatively angularly movable pairs. The trammel points and alignment bar 1 constitute one pair, as already described, and the scale plate and index member constitute the other pair. One member of one pair is controlled by or moves in accordance with movement of one member of the other pair, and the other two members are operatively connected for conjoint movement, but it is largely immaterial to which member of the second pair a given member of the first pair is connected. The pivot of one pair may coincide with the pivot of the other pair, or they may be separate. The manner of connection, whether direct as in Figure 3 or indirect as in Figure 1, is likewise immaterial.

A pitchometer tool thus constructed may be applied directly to the propeller, its alignment bar aligned with the propeller hub, visually or by mechanical means, and there can be read directly for any given radius of measurement the proper pitch distance, or for a known pitch distance, the proper pitch angle can be set off, and the blade may be tested in this manner without the necessity of referring to charts.

What I claim as my invention is:

1. A pitchometer tool comprising a scale plate and an index member, the two being pivotally connected and constituting a relatively movable pair, trammel points for contact with the propeller blade, and operatively connected to one member of said pair, an alignment bar connected to the other member, and adapted for alignment with the axis of the propeller, said scale plate having thereon a plurality of lines corresponding to different radii of measurement upon the propeller blade, subdivided and positioned to cooperate with the index member to indicate directly the pitch distance at the indicated diameter for any given pitch angle, and adjustable means constituting part of the index member and movable to co-operate with the lines for different radii.

2. A pitchometer tool comprising a scale plate and an index member, the two being pivotally connected and constituting a relatively movable pair, trammel points for contact with the propeller blade, and operatively connected to one member of said pair, an alignment bar operatively connected to the other member, and adapted for alignment with the axis of the propeller, said scale plate having thereon a plurality of lines corresponding to different radii of measurement upon the propeller blade, subdivided and positioned to cooperate with the index member to indicate directly the pitch distance at the indicated diameter for any given pitch angle, and means included in one of the operative connections to move the members of the relatively movable pair a multiple greater than unity of the distance moved by the trammel points relative to the alignment bar, from one position to any other, thereby to magnify the spacing between subdivisions on the scale plate.

3. A pitchometer tool comprising a sector-shaped scale plate and an index arm pivotally connected and constituting a relatively movable pair, an indicator adjustable along the index arm and movable over the scale plate to indicate a selected radius, said scale plate having thereon circular arcs corresponding to different radii of measurement upon the propeller blade, and each arc subdivided to indicate, in cooperation with the indicator, the pitch distance for the subtended angle at the indicated radius, trammel points for contact with the propeller blade, and operatively connected to one member of the relatively movable pair, and an alignment bar connected to the other member, and adapted for alignment with the propeller axis.

4. A pitchometer tool comprising an alignment bar adapted for alignment with the axis of the propeller, a disk pivotally mounted thereon, an index member movable with the alignment bar over said disk, the disk bearing circles corresponding to different radii of measurement upon the propeller blade, each circle being divided to correspond to different pitch distances at the angles indicated by the index member at the indicated radius, trammel points pivotally mounted upon the alignment bar for contact with the propeller blade at different radii, corresponding to the disk circles, and a gear connection between said trammel points and the disk, to rotate the latter through a multiple of the angle through which the trammel points move from any one position to another.

5. A pitchometer tool comprising an alignment bar adapted for alignment with the axis of the propeller, a disk rotatably mounted thereon, an index arm secured to the alignment bar and overlying said disk, an index pointer movable on said index arm radially of the disk, the disk bearing circles corresponding to different radii of measurement upon the propeller blade, each circle being subdivided to correspond to different pitch distances at the angles indicated by the index pointer at the indicated radius, trammel points pivotally mounted upon the alignment bar for contact with the propeller blade, thereby to assume a given angle relative to the alignment bar, complemental to the pitch angle of the blade at the selected radius, a gear segment formed on the trammel points, and a smaller pinion meshed therewith and secured to the disk, to magnify the angular movement of the latter from its zero point, corresponding to the variance of the pitch angle from zero.

6. A pitchometer tool comprising an alignment bar adapted for alignment with the axis of the propeller, trammel points pivotally mounted on said bar, and adapted for contact with the propeller blade, thereby to assume a given angle relative to the bar, corresponding to the pitch angle of the blade at the selected radius of measurement, a scale-bearing member having thereon a scale divided correspondingly to the pitch distances at selected pitch angles for the selected radius of measurement, an index member cooperating with said scale-bearing member, and constituting therewith a relatively movable pair, one member of such pair being movable in conformity with the alignment bar, and means interposed between the other and the trammel points to move the other through a multiple exceeding unity of the distance moved by the trammel points, in conformity with the movement of the latter.

7. A pitchometer tool comprising a scale plate and an index member, the two being pivotally connected and constituting a relatively angularly movable pair, trammel points for contact with the propeller blade and an alignment bar for alignment with the propeller axis pivotally connected thereto, one member of said pair being connected to said trammel points for corresponding angular movement, and the other member of said pair being connected to said alignment bar, whereby movement of the trammel points relative to the alignment bar is reflected in corresponding relative movement of the index member and scale plate, and means associated with said movable pair to effect relative movement of said index member and scale plate through a greater angular travel than the relative angular movement of the trammel points and alignment bar.

8. A pitchometer tool comprising a scale plate and an index member, the two being pivotally connected and constituting a relatively angularly movable pair, trammel points for contact with the propeller blade and an alignment bar for alignment with the propeller axis pivotally connected thereto, one member of said pair being connected to said trammel points for corresponding angular movement, and the other member of said pair being connected to said alignment bar, whereby movement of the trammel points relative to the alignment bar is reflected in corresponding relative movement of the index member and scale plate, and means associated with said movable pair to effect relative movement of said index member and scale plate through a greater angular travel than the relative angular movement of the trammel points and alignment bar, and said scale plate having thereon a plurality of lines corresponding to different radii of measurement upon the propeller blade, subdivided and positioned to cooperate with the index member to indicate directly the pitch distance at the indicated radius for any given pitch angle.

BERT O. GODFREY.